United States Patent
Newby

[11] Patent Number: 6,027,294
[45] Date of Patent: Feb. 22, 2000

[54] DOUBLE NUT THREAD FRICTION LOCKING SAFETY CAP DEVICE WITH OPPOSING THREADS WITH A CAPTURED SPRING OR SPRING LOCK WASHER

[76] Inventor: John C. Newby, P.O. Box 989, Cobb, Calif. 95426

[21] Appl. No.: 09/237,288

[22] Filed: Jan. 25, 1999

[51] Int. Cl.[7] .............................. F16B 37/14; F16B 39/12
[52] U.S. Cl. ............................ 411/231; 411/237; 411/429
[58] Field of Search ................................... 411/222, 231, 411/237, 244, 931, 932, 429

[56] References Cited

U.S. PATENT DOCUMENTS

| | | | |
|---|---|---|---|
| 898,432 | 9/1908 | Boyle | 411/237 |
| 1,438,097 | 12/1922 | Cole | 411/237 |
| 3,877,597 | 4/1975 | Montgomery et al. | |
| 4,572,387 | 2/1986 | Luker et al. | |
| 4,897,008 | 1/1990 | Parks | |
| 4,936,727 | 6/1990 | Kolvereid | 411/237 |
| 5,071,300 | 12/1991 | McCauley | |
| 5,127,782 | 7/1992 | McCorkle et al. | |
| 5,201,201 | 4/1993 | Sylvester et al. | |
| 5,248,232 | 9/1993 | Chiang | 411/237 |
| 5,615,788 | 4/1997 | Larguia | |
| 5,855,463 | 1/1999 | Newby | 411/244 |

Primary Examiner—Neill Wilson

[57] ABSTRACT

A double nut thread friction locking safety cap device assembly consisting of several components, which are so constructed and assembled to resist the rotational effects of external forces. The resistance is achieved by the use and placement of opposing threads (right and left hand threads) with differing threads per inch and the containment of a compressed spring force and the use of the clearance between matching female and male threads. The outer cap nut and inner nut matching threads are axially aligned and the two are threaded together in opposite directions to compress a captured spring(s) or lock washer(s). This preloaded, three part assembly with matching inner female threads on both the outer cap nut and inner nut are axially aligned with each other is then rotated onto the threaded pipe end with matching male threads and is rotated until the pipe end is forced against a sealing surface of the cap nut or a sealing insert installed within the cap nut. Once in place and the pipe end is sealed the outer cap nut and inner nut are rotated in the opposite direction from each other, which transfers the preload to the male threaded pipe threads. This is due to the clearance between the two sets of male and female threads and to the threads per inch difference between the two sets. The outer cap nut and inner nut of the assembly can only be rotated in an opposite direction to each other until they meet the resisting force of the opposite hand thread interaction. The assembly is now in a load condition whereas to loosen itself from the pipe threads it must tighten itself against and overcome the spring force of the spring lock washer(s) or spring(s).

5 Claims, 5 Drawing Sheets

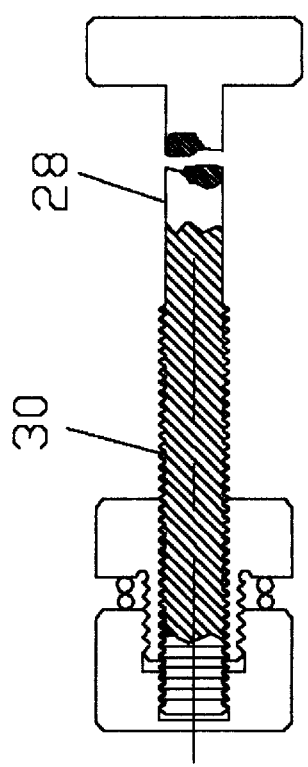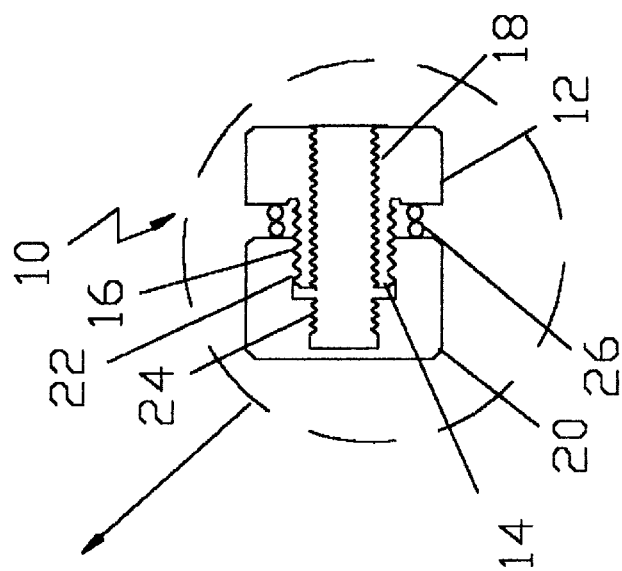

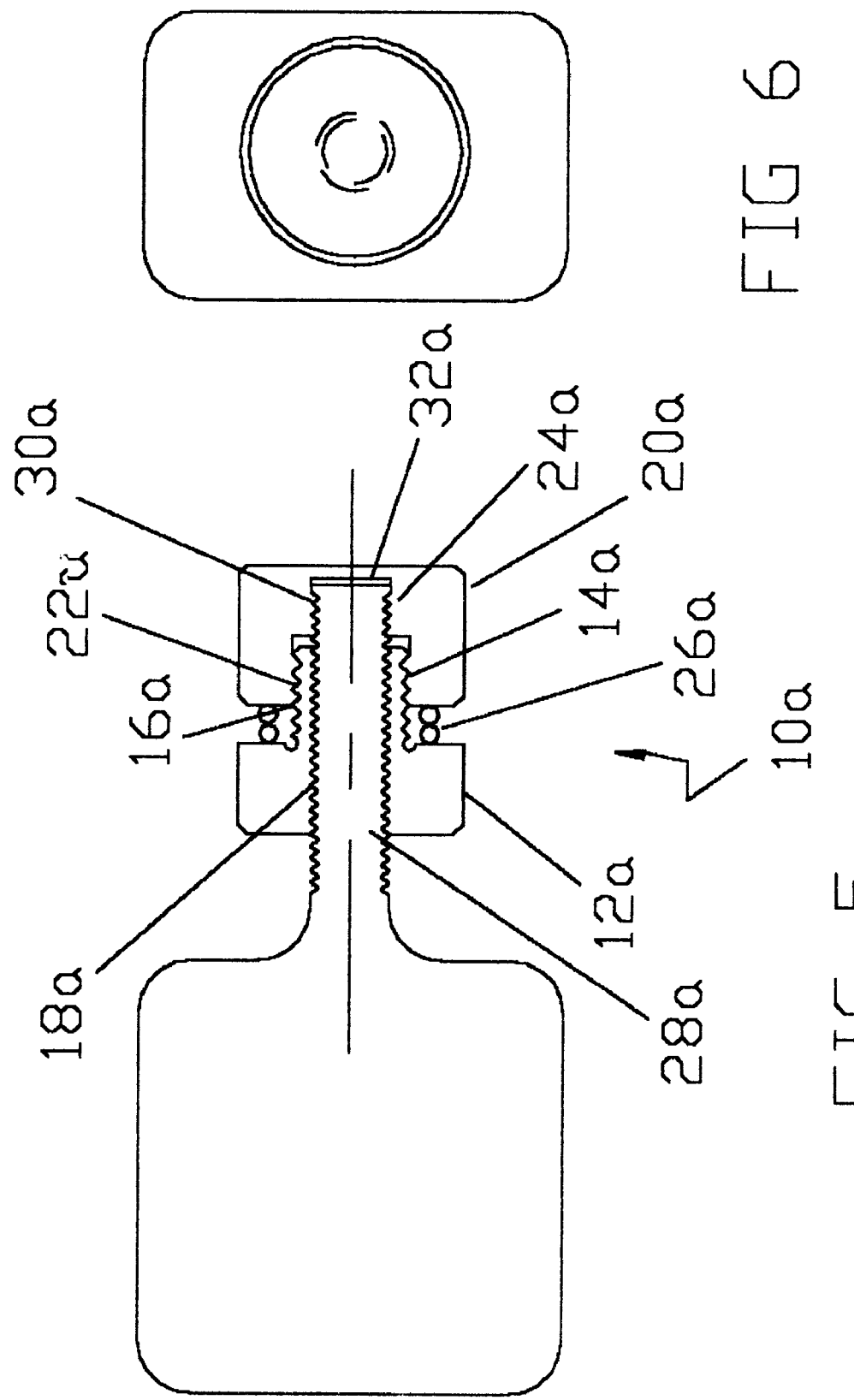

DOUBLE NUT THREAD FRICTION LOCKING SAFETY CAP DEVICE WITH OPPOSING THREADS WITH A CAPTURED SPRING OR SPRING LOCK WASHER

FIELD OF THE INVENTION

This invention relates generally to a thread locking device and more particularly to an outer cap nut and an inner nut friction locking assembly with opposing hand threads that can function to lock onto male threaded bolt ends, threaded shaft ends, and to seal threaded pipe ends and male threaded container necks.

DESCRIPTION OF PRIOR ART

Inventors have developed many techniques to prevent the untimely loosening by Human interference of a cap nut after it has been installed. One example of this is the shrouded cap nut of inventors McCorkle et al. with their self locking castellated nut Pat. No. 5,127,782. Another type shrouded jam locknut Pat. No. 5,071,300 by McCauley provides a jam locknut which conceals an exposed nut against unauthorized access and removal and simultaneously provides a jamming action to the nut to prevent loosing.

Another modern example of a lock nut device is the double locking nut. It is an assembly of two nuts with the same thread as the bolt or shaft, however each nut is of a different pitch. Once the first nut is installed and tightened the second nut is then rotated against the first nut and then tightened this produces a clamping action between the two nuts and the shaft threads which prevents rotation of either nut.

Another type lock nut device is the opposing thread assembly. An example of this type is shown in Pat. No. 4,909,689 invented by Minoru Komatsu of Japan (1990). This device is a double nut with opposing threads. The fist nut is a flanged conical shaped nut with conical portion above the flange. The nut is threaded through the center with female threads, the outer conical form above the flange is threaded with male threads. The entire nut is slit through the flange and the conical form to make the nut diametrically contractible. At assembly a nut compatible with the male threads of the conical form is threaded on, and tightened which produces a clamping action on the bolt or shaft Inventors have also developed devices for sealing pipe ends to prevent unauthorized access to liquid or gas supplies. One example of these devices is a lockable sealer for the end of a threaded pipe Pat. No. 5,201,201 invented by Sylvester and Gillette.

Another field in which the locking cap design has been used is that of the child-resistant closure for a liquid container. An example of this is that of Pat. No. 3,877,597 of Julian and Montgomery.

SUMMARY OF INVENTION

The purpose of this invention is to improve the functional use of an existing invention so that it can include a wider range of applications. The improvements are to modify an invention described in U.S. Pat. No. 5,855,463 FIG. 2 of Newby. A brief description of the changes, as shown in FIG. 9 and FIG. 10 are as follows: The nut 20 is removed it is replaced with modified nut 21 which includes seal insert 33. The bolt 28 is removed, and it is replaced with pipe 29.

Briefly, the invention includes a thread locking device assembly consisting of five components a outer cap nut with a seal insert (when required), a inner nut, a threaded pipe or threaded shaft and a compression spring or spring washer, that are so constructed and assembled to resist the rotational effects of external forces. The resistance is achieved by the use and placement of opposite hand threads with differing threads per inch and predetermined clearance and allowance between mating female and male threads. And, also the containment of a spring force generated by the compression of a spring(s) or spring lock washer(s). This assembly is designed so as to resist the loosing effects of any resultant rotational movement produced by external forces. The outer cap nut and the inner nut matching threads are axially aligned and the two are rotated in a opposite direction to each other in order to engage threads, which compresses the captured spring(s) or spring lock washer(s). This preloaded, three part assembly with matching inner female threads axially aligned to each other is then rotated onto the threaded pipe or container neck with matching male threads. Once in place the outer cap nut and the inner nut are rotated in the opposite direction from each other, which transfers the preload to the male threaded pipe or container neck threads. Because of the differing threads per inch and opposite hand of the threaded parts they can only rotate to the resisting force of the opposite hand thread interaction. The force produced by the compressed spring separating the bolt and nut is now transferred from between these two parts to include the male threaded pipe or threaded container neck. The spring force is now pushing the matching common female threads in opposite directions against the male threads of the pipe or container neck threads that joins these two parts. The assembly is now in a load condition whereas to loosen itself from the pipe or container neck threads it must tighten itself against and overcome the spring force of the lock washer(s) or spring(s). Both the outer cap nut and the inner nut, once rotated onto the male threaded pipe or threaded container neck can not be rotated any farther than the clearance between them, which is provided in their manufacture. The only way these two parts, and the spring may be easily separated is if the spring is recompressed to its installation configuration only then the assembly can be rotated off of the male threaded pipe or threaded container neck with very little resistance.

Another relevant fact is that all of the parts if not off the shelf can be made using preexisting technology. That is to say, the parts can be made with standard fastener manufacturing technology.

Another factor that is important is the fact that to renew the gripping force of the two nuts to its initial value, simply replace the spring lock washer with a new, unused one.

BRIEF DESCRIPTION OF THE DRAWING

FIG. 1 is an elevation view of a preferred embodiment of the present invention shown with spring compressed and the two innermost female threads aligned ready for installation.

FIG. 2 is a view of FIG. 1 installed on a bolt thread with the spring force has been partially released and the assembly is in a locked condition.

FIG. 5 is a elevation view of another embodiment of the present invention with a modified version functioning as a container cap.

FIG. 6 is an end view of FIG. 5.

DETAILED DESCRIPTION OF THE PREFERRED EMBODIMENT(S)

Figure 4:
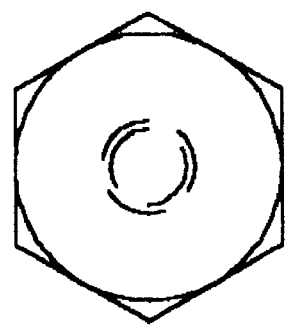
FIG. 4 shown an end view of FIG. 3.

Referring to FIGS. 1–2 A inner nut and outer cap nut friction locking assembly 10. In accordance with the present invention includes four components. A inner nut 12, an outer cap nut 20, a spring 26 and a male threaded bolt 28. The inner nut 12 preferably with a hex head, however it can be any appropriate shape. The shaft 14 of inner nut 12 to be threaded with a male thread 16 and through the center of the shaft a female thread of opposite hand threads 18 is machined. All of the threads are to be concentric with each other. The second component, a outer cap nut 20 preferably with a hex shape, however can be any appropriate shape. The outer cap nut 20 is to have a female thread 22 part way through itself which is to be threadable with male thread 16. The clearance between male thread 16 and female thread 22 to be determined when they are manufactured. At the opposite end of outer cap nut 20 a second smaller diameter female thread 24 concentric with thread 22 is machined a predetermined distance into outer cap nut 20. The thread 24 is identical to thread 18 of inner nut 12. When manufactured these two threads are to be constructed so that when assembled, with the captured spring washer 26 compressed, they can be threaded onto bolt 28 with threads 30.

The operation of the present invention will be discussed in reference to FIGS. 1–2. Prior to assembly with the male threaded bolt 28, the inner nut 12 is preassembled to nut 20 with spring washer 26 captured between the two. The outer cap nut 20 and the inner nut 12 are rotated with respect to each other such that the spring washer is compressed to a predetermined distance. This is the point at which the inner female threads 18 of the inner nut 12 are aligned with the inner female threads 24 of outer cap nut 20. The nut assembly is now ready to be rotated onto bolt 28 with threads 30. Once the location of the nut assembly on the bolt threads is determined, the outer cap nut 20 and the inner nut 12 are counter rotated until they can no longer be turned. At this point most of the force of the compressed spring washer has been transferred from the nut and inner nut and outer cap nut to include the bolt threads 30. To remove the nut assembly, rotate each (the inner nut and the outer cap nut) so that the spring is recompressed to its initial condition.

Figure 3:
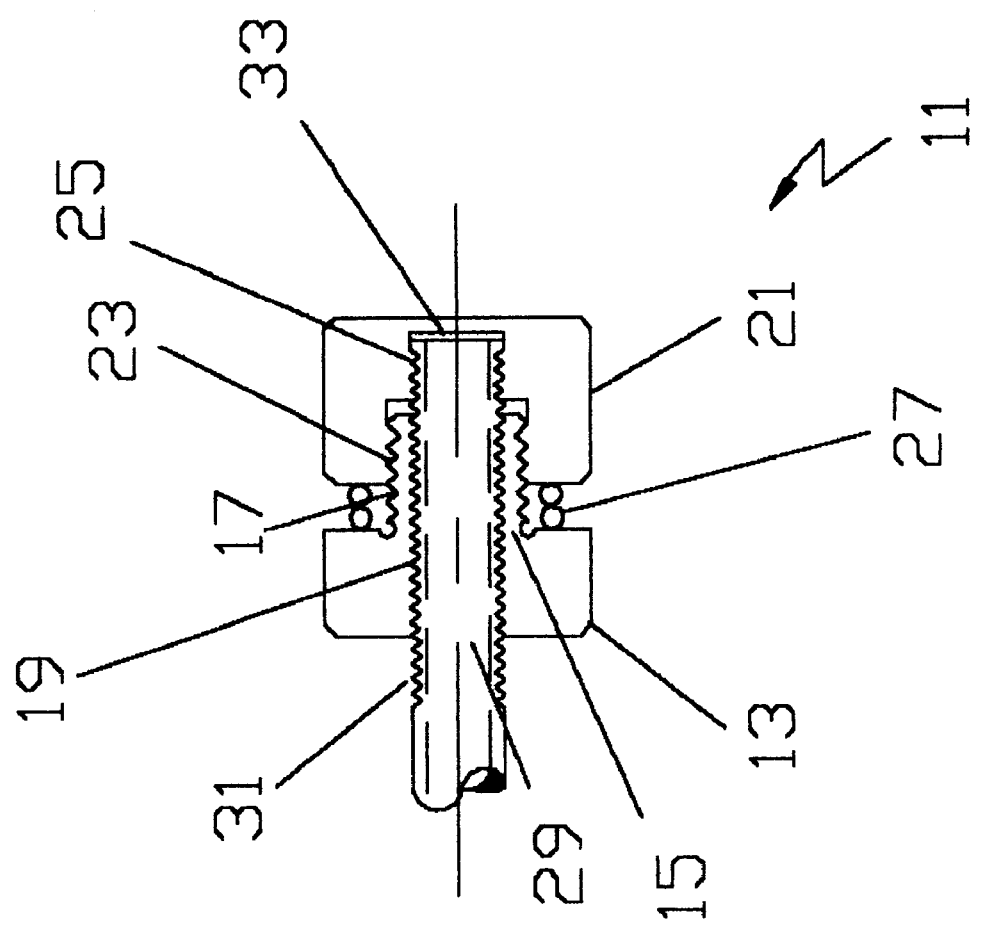
FIG. 3 is a elevation view of another embodiment of the present invention with a modified version functioning as a pipe end cap.

Referring to FIGS. 3–4 A inner nut and outer cap nut friction locking assembly 11. In accordance with the present invention includes four components. A inner nut 13, an outer cap nut 21 with sealing insert 33 installed, a spring 27 and a male threaded pipe 29. The inner nut 13 preferably with a hex head, however it can be any appropriate shape. The shaft 15 of inner nut 13 to be threaded with a male thread 17 and through the center of the shaft a female thread of opposite hand threads 19 is machined. All of the threads are to be concentric with each other. The second component, a outer cap nut 21 preferably with a hex shape, however can be any appropriate shape. The outer cap nut 21 is to have a female thread 23 part way through itself which is to be threadable with male thread 17. The clearance between male thread 17 and female thread 23 to be determined when they are manufactured. At the opposite end of outer cap nut 21 a second smaller diameter female thread 25 concentric with thread 23 is machined a predetermined distance into outer cap nut 21. The thread 25 is identical to thread 19 of inner nut 13. When manufactured these two threads are to be constructed so that when assembled, with the captured spring washer 27 compressed, they can be threaded onto a pipe 29 with threads 31.

The operation of the present invention will be discussed in reference to FIGS. 3–4. Prior to assembly with the male threaded pipe 29, the inner nut 13 is preassembled to outer cap nut 21 with spring washer 27 captured between the two. The outer cap nut 21 and the inner nut 13 are rotated with respect to each other such that the spring washer is compressed to a predetermined distance. This is the point at which the inner female threads 19 of the inner nut 13 are aligned with the inner female threads 25 of outer cap nut 21. The nut assembly is now ready to be rotated onto pipe 29 with threads 31. Once the location of the nut assembly on the pipe threads is determined, the outer cap nut 21 and the inner nut 13 are counter rotated until they can no longer be turned. At this point most of the force of the compressed spring washer has been transferred from inner nut and outer cap nut to include the pipe threads 31. To remove the double nut assembly, rotate each (the inner nut and the outer cap nut) so that the spring is recompressed to its initial condition.

Referring to FIGS. 5–6 A inner nut and outer cap nut friction locking assembly 10a. In accordance with the present invention includes four components. A inner nut 12a, an outer cap nut 20a with sealing insert 32a installed, spring 26a and a male threaded container neck 28a. The inner nut 12a preferably with a hex head, however it can be any appropriate shape. The shaft 14a of inner nut 12a to be threaded with a male thread 16a and through the center of the shaft a female thread of opposite hand threads 18a is machined. All of the threads are to be concentric with each other. The second component, a outer cap nut 20a preferably with a hex shape, however can be any appropriate shape. The outer cap nut 20a is to have a female thread 22a part way through itself which is to be threadable with male thread 16a. The clearance between male thread 16a and female thread 22a to be determined when they are manufactured. At the opposite end of outer cap nut 20a a second smaller diameter female thread 24a concentric with thread 22a is machined a predetermined distance into outer cap nut 20a. The thread 24a is identical to thread 18a of inner nut 12a. When manufactured these two threads are to be constructed so that when assembled, with the captured spring washer 26a compressed, they can be threaded onto a threaded container neck 28a with threads 30a.

The operation of the present invention will be discussed in reference to FIGS. 5–6. Prior to assembly with the male threaded container neck 28a, the inner nut 12a is preassembled to outer cap nut 20a with spring washer 26a captured between the two. The outer cap nut 20a and the inner nut 12a are rotated with respect to each other such that the spring washer is compressed to a predetermined distance. This is the point at which the inner female threads 18a of the inner nut 12a are aligned with the inner female threads 24a of outer cap nut 20a. The nut assembly is now ready to be rotated onto the container neck 28a with threads 30a. Once the location of the nut assembly on the container neck is determined, the outer cap nut 20a and the inner nut 12a are counter rotated until they can no longer be turned. At this point most of the force of the compressed spring washer has been transferred from the inner nut and outer cap nut to include container neck threads 30a. To remove the nut assembly, rotate each (the inner nut and the outer cap nut) so that the spring is recompressed to its initial condition.

Figure 8:
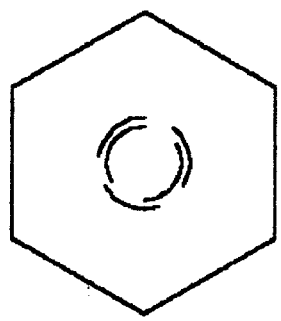
FIG. 8 shows an end view of FIG. 7.
Figure 7:
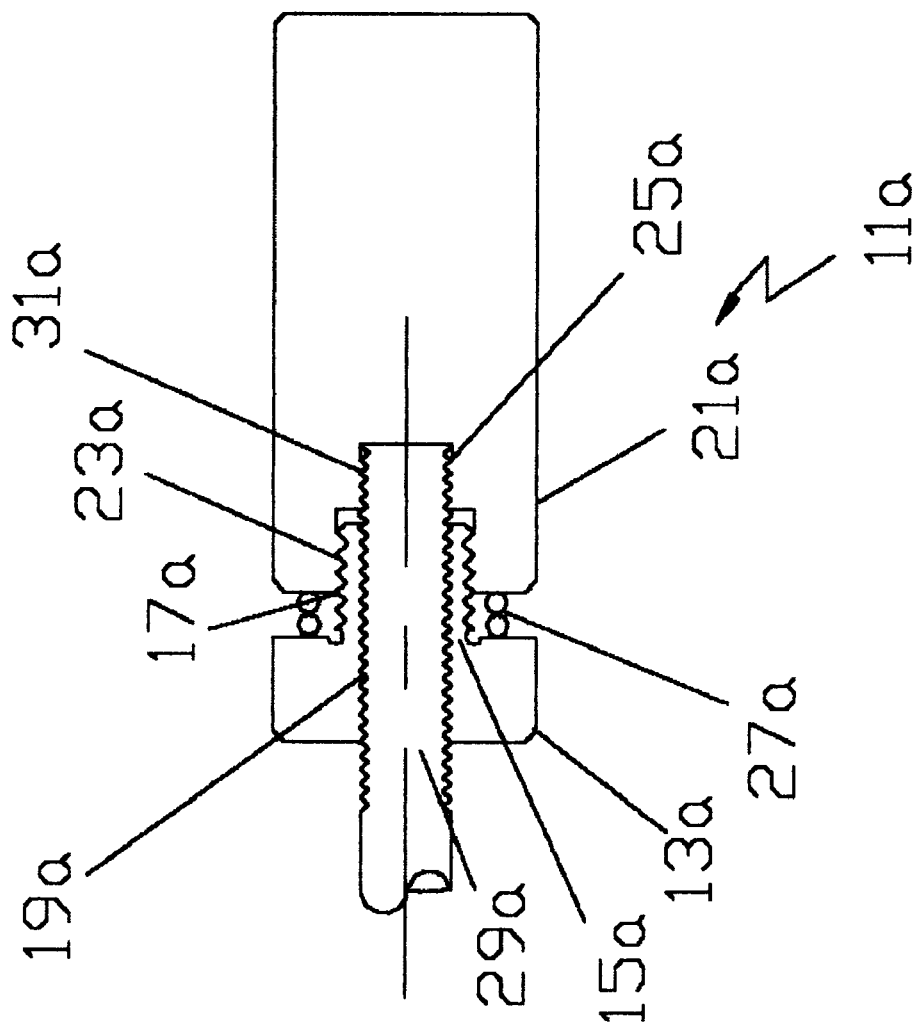
FIG. 7 is a elevation view of another embodiment of the present invention with a modified version functioning as a tool handle.
Figure 10:
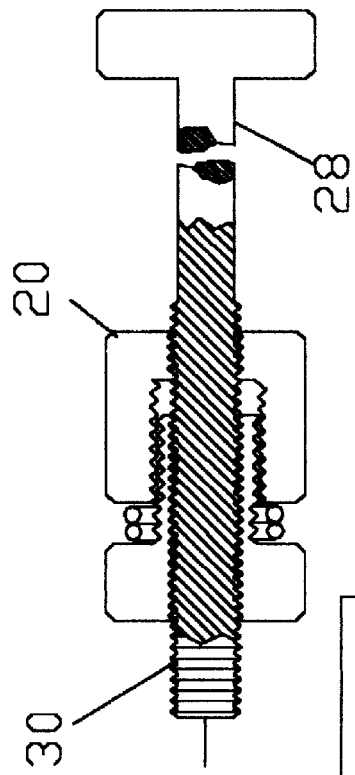
FIG. 10 is a elevation view of prior art (FIG. 2 of Pat. No. 5,855,463).
Figure 9:
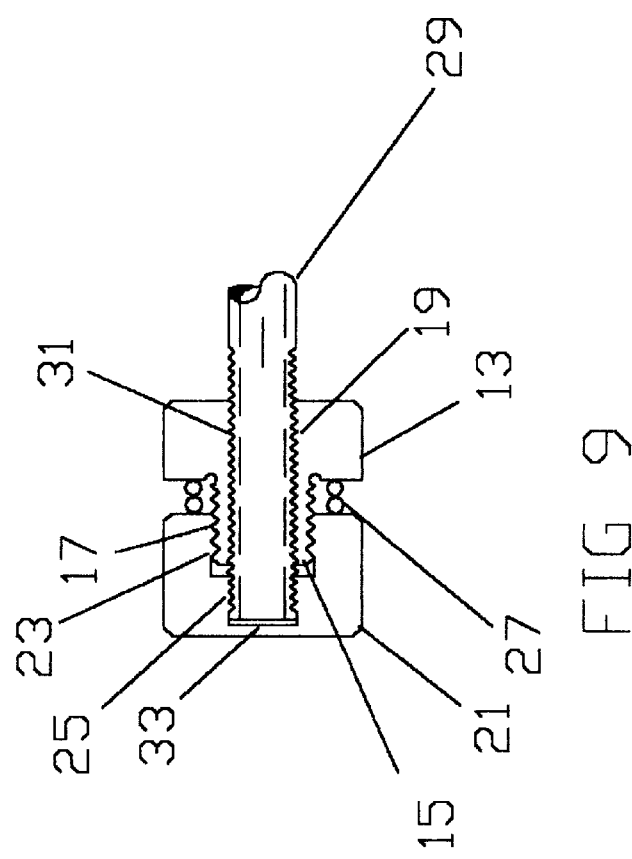
FIG. 9 is a elevation view of improvements and modifications to prior art.

Referring to FIGS. 7–8 A inner nut and outer cap nut friction locking assembly 11a. In accordance with the present invention includes four components. A inner nut 13a, an outer cap nut 21a, (length extended to function as a removable handle for a tool) a spring 27a and a male threaded shaft 29a. The inner nut 13a preferably with a hex head, however it can be any appropriate shape. The shaft 15a of inner nut 13a to be threaded with a male thread 17a and through the center of the shaft a female thread of opposite hand threads 19a is machined. All of the threads are to be concentric with each other. The second component, a outer cap nut 21a preferably with a hex shape, however can be any appropriate shape. The outer cap nut 21a is to have a female thread 23a part way through itself which is to be threadable with male thread 17a. The clearance between male thread 17a and female thread 23a to be determined when they are manufactured. At the opposite end of outer cap nut 21a a second smaller diameter female thread 25a concentric with thread 23a is machined a predetermined distance into outer cap nut 21a. The thread 25a is identical to thread 19a of inner nut 13a. When manufactured these two threads are to be constructed so that when assembled, with the captured spring washer 27a compressed, they can be threaded onto a threaded shaft 29a with threads 31a.

The operation of the present invention will be discussed in reference to FIGS. 7–8. Prior to assembly with the male threaded shaft 29a, the inner nut 13a is preassembled to nut 21a with spring washer 27a captured between the two. The outer cap nut 21a and the inner nut 13a are rotated with respect to each other such that the spring washer is compressed to a predetermined distance. This is the point at which the inner female threads 19a of the inner nut 13a are aligned with the inner female threads 25a of outer cap nut 21a. The double nut assembly is now ready to be rotated onto shaft 29a with threads 31a. Once the location of the nut assembly on the shaft threads is determined, the outer cap nut 21a and the inner nut 13a are counter rotated until they can no longer be turned. At this point most of the force of the compressed spring washer has been transferred from the inner nut and the outer cap nut to include the shaft threads 31a. To remove the double nut assembly, rotate each (the inner nut and the outer cap nut) so that the spring is recompressed to its initial condition.

While this invention has been described in terms of a few preferred embodiments, it is contemplated that persons reading the proceedings descriptions and studying the drawings will realize various alterations, permutations and modifications thereof. It is therefore intended that the following appended claims be interpreted as including all such alterations, permutations and modification as fall within the true spirit and scope of the present invention.

What is claimed is:

1. A locking nut assembly comprising:
   (a) a first nut having an opening therethrough, the opening having first female threads therein adapted for threading engagement with a male threaded member, the first nut having a first outer portion of a given diameter and a second outer portion of reduced diameter relative to the first diameter portion of the first nut, the reduced diameter portion having first male threads therein, the first male threads being substantially concentric with the first female threads and opposite-handed relative to the first female threads, and;
   (b) a second nut having an opening to a predetermined depth, the opening having a first inner portion of a given diameter, the first inner portion having first female threads therein also adapted for threading engagement with the male threaded member such that the first female threads of the second nut are of similar diameter and the same handiness as the first female threads of the first nut, the second nut having a second inner portion of a larger diameter relative to the first inner portion, the second inner portion having second female thread of similar diameter and same-handiness as the first male threads of the first nut such that the first male threads of the first nut can be threadedly engaged and assembled with the second female threads of the second nut, the first and second female threads of the second nut being substantially concentric with each other; and
   (c) a spring means for insertion between the first and second nuts prior to their assembly such that the spring is compressed between the nuts when assembled for biasing the nuts in a relative unthreading direction, wherein the assembled first nut, second nut, and spring means can be removably threaded onto the male threaded member in a torque-resistant connection.

2. A locking nut assembly comprising:
a male threaded pipe member, and;
   (a) a first nut having an opening therethrough, the opening having first female threads therein adapted for threading engagement with a male threaded member, the first nut having a first outer portion of a given diameter and a second outer portion of reduced diameter relative to the first diameter portion of the first nut, the reduced diameter portion having first male threads therein, the first male threads being substantially concentric with the first female threads and opposite-handed relative to the first female threads; and
   (b) a second nut having an opening to a predetermined depth, the opening having a first inner portion of a given diameter, the first inner portion having first female threads therein also adapted for threading engagement with the male threaded member such that the first female threads of the second nut are of similar diameter and the same handiness as the first female threads of the first nut, the second nut having a second inner portion of a larger diameter relative to the first inner portion, the second inner portion having second female thread of similar diameter and same-handiness as the first male threads of the first nut such that the first male threads of the first nut can be threadedly engaged and assembled with the second female threads of the second nut, the first and second female threads of the second nut being substantially concentric with each other; and
   (c) a spring means for insertion between the first and second nuts prior to their assembly such that the spring is compressed between the nuts when assembled for biasing the nuts in a relative unthreading direction, wherein the assembled first nut, second nut, and spring means can be removably threaded onto the male threaded member in a torque-resistant connection.

3. A locking nut assembly comprising:
a male threaded container neck, and;
   (a) a first nut having an opening therethrough, the opening having first female threads therein adapted for threading engagement with a male threaded member, the first nut having a first outer portion of a given diameter and a second outer portion of reduced diameter relative to the first diameter portion of the first nut, the reduced diameter portion having first male threads therein, the first male threads being substantial concentric with the first female threads and opposite-handed relative to the first female threads, and;

(b) a second nut having an opening to a predetermined depth, the opening having a first inner portion of a given diameter, the first inner portion having first female threads therein also adapted for threading engagement with the male threaded member such that the first female threads of the second nut are of similar diameter and the same handiness as the first female threads of the first nut, the second nut having a second inner portion of a larger diameter relative to the fist inner portion, the second inner portion having second female thread of similar diameter and same-handiness as the first male threads of the first nut such that the first male threads of the first nut can be threadedly engaged and assembled with the second female threads of the second nut, the first and second female threads of the second nut being substantially concentric with each other; and (c) a spring means for insertion between the first and second nuts prior to their assembly such that the spring is compressed between the nuts when assembled for biasing the nuts in a relative unthreading direction, wherein the assembled first nut, second nut, and spring means can be removably threaded onto the male threaded member in a torque-resistant connection.

4. A locking nut assembly comprising:

a male threaded shaft, and;

(a) a first nut having an opening therethrough, the opening having first female threads therein adapted for threading engagement with a male threaded member, the first nut having a first outer portion of a given diameter and a second outer portion of reduced diameter relative to the first diameter portion of the first nut, the reduced diameter portion having first male threads therein, the first male threads being substantially concentric with the first female threads and opposite-handed relative to the first female threads, and;

(b) a second nut having an opening to a predetermined depth, the opening having a first inner portion of a given diameter, the first inner portion having first female threads therein also adapted for threading engagement with the male threaded member such that the first female threads of the second nut are of similar diameter and the same handiness as the first female threads of the first nut, the second nut having a second inner portion of a larger diameter relative to the first inner portion, the second inner portion having second female thread of similar diameter and same-handiness as the first male threads of the first nut such that the first male threads of the first nut can be threadedly engaged and assembled with the second female threads of the second nut, the first and second female threads of the second nut being substantially concentric with each other; and (c) a spring means for insertion between the first and second nuts prior to their assembly such that the spring is compressed between the nuts when assembled for biasing the nuts in a relative unthreading direction, wherein the assembled first nut, second nut, and spring means can be removably threaded onto the male threaded member in a torque-resistant connection.

5. A locking nut assembly as recited in claim 2 whereas all threads of said assembly are of the same handiness.

* * * * *